United States Patent

[11] 3,634,034

[72] Inventors John D. Nickerson;
Robert A. Wiesboeck, both of Atlanta, Ga.
[21] Appl. No. 702,548
[22] Filed Feb. 2, 1968
[45] Patented Jan. 11, 1972
[73] Assignee United States Steel Corporation
Pittsburgh, Pa.

[54] PROCESS FOR PREPARING PHOSPHORUS PENTAFLUORIDE AND FLUOROPHOSPHORIC ACIDS
11 Claims, No Drawings

[52] U.S. Cl. .................................................. 23/205
[51] Int. Cl. ............................................. C01b 25/10
[50] Field of Search .......................................... 23/205, 368, 139, 203

[56] References Cited
UNITED STATES PATENTS

| | | | |
|---|---|---|---|
| 1,865,204 | 6/1932 | Otto et al. ...................... | 23/205 |
| 2,488,298 | 11/1949 | Lange et al. ................... | 23/139 |
| 3,402,019 | 9/1968 | Bowkley et al. ............... | 23/203 X |

Primary Examiner—Oscar R. Vertiz
Assistant Examiner—G. O. Peters
Attorney—Gene Harsh ABSTRACT: Phosphorus pentafluoride and fluorophosphoric acids are prepared from a fluoride salt, phosphoric acid or monofluorophosphoric acid, and sulfur trioxide by heating the mixture to evolve phosphorus pentafluoride and/or fluorophosphoric acid gases, and recovering the gases.

PROCESS FOR PREPARING PHOSPHORUS PENTAFLUORIDE AND FLUOROPHOSPHORIC ACIDS

BACKGROUND AND SUMMARY

Conventional processes for the manufacture of phosphorus pentafluoride are based on the halogen exchange of phosphorus pentachloride with arsenic trifluoride, $$3PCl_5 + 5AsF_3 \rightarrow 3PF_5 + 5AsCl_3$$

or on the chlorofluorination of phosphorus trifluoride, $$5PF_3 + Cl_2 \rightarrow 3PF_5 + 2PCl_3$$

Both methods require extensive fractionation to separate mixed halides ($PClF_4$, $PCl_2F_3$, etc.) from phosphorus pentafluoride.

Fluorophosphoric acids, on the other hand, are produced from phosphorus pentoxide and hydrogen fluoride at the appropriate molar ratios.

$$P_2O_5 3HF \rightarrow H_2PO_3F + HPO_2F_2$$
$$P_2O_5 + 12HF \rightarrow 2HPF_6 + 10H_2O$$

We have discovered that phosphorus pentafluoride and fluorophosphoric acids can be prepared in a single operation from a fluoride salt, phosphoric acid or monofluorophosphoric acid, and sulfur trioxide by heating the reactants in the range of about 120°–350° C. (preferably about 200° C.) to evolve the phosphorus-fluorine compounds as gases, and recovering the products by condensation or other means. In the preferred operation, the phosphoric acid or monofluorophosphoric acid is mixed with the sulfur trioxide before contacting the fluoride salt.

The overall reaction is illustrated by the following equation for the case of the calcium salt and where hexafluorophosphoric acid is the fluorophosphoric acid product.

$$6CaF_2 2H_3PO_4 + 6SO_3 \rightarrow PF_5 + HPF_6 \cdot 2H_2O + HF + 6caSW_4$$

The volatile phosphorus-fluorine compounds are evolved on heating the reactants to 120°–350° C. On cooling, fluorophosphoric acids condense. The remaining gas is phosphorus pentafluoride.

The phosphoric acid may be furnace acid or wet process phosphoric acid and we prefer to employ phosphoric acid containing about 65–82 weight percent $P_2O_5$ or more on analysis basis. Best results have been obtained by using 70–72 weight percent $P_2O_5$. Fluorspar can be advantageously used as the fluoride salt.

DETAILED DESCRIPTION

The phosphorus pentafluoride and fluorophosphoric acid products are obtained by the heating of a fluoride salt, phosphoric acid or monofluorophosphoric acid, and sulfur trioxide. The sulfur trioxide may be combined with the phosphoric acid or monofluorophosphoric acid by passing gaseous sulfur trioxide through the acid or by the direct addition of liquid sulfur trioxide with stirring and cooling. In the premixing of the acid with sulfur trioxide, we prefer to employ a reactant ratio of $P:SO_3$ of 1:3.

In the preferred operation of the process, phosphoric acid containing 65–82 percent $P_2O_5$, preferably 70–72 percent, is treated with sulfur trioxide until a mole ratio of $3SO_3/H_3PO_4$ is reached. This can be achieved by passing gaseous sulfur trioxide through the acid or by the direct addition of liquid sulfur trioxide with adequate stirring and cooling. It is advantageous to maintain the phosphoric acid at 50°–100° C. If a pressurized system is employed, the acid temperature may be as high as 200° C. The resulting liquid consists essentially of a mixture of pyrosulfuric acid and metaphosphoric acid coordinated with 1 mole of sulfur trioxide formed according to $$H_3PO_4 az3SO_3 \rightarrow H_2S_2O_7 + HPO_3SO_3$$

Phosphoric acid and sulfur trioxide can in part be replaced by $P_2O_5$ and sulfuric acid in proportions consistent with the overall stoichiometry of the system.

The acid mixture is added to the fluoride and heated to 120°–350° C., preferably 200° C. Any metal fluoride such as an alkali or alkaline earth fluoride can be used as the fluoride source. The economically preferred source is fluorspar. As indicated above, the phosphoric acid may be replaced in whole or in part with monofluorophosphoric acid.

The reactant ratio of P, $SO_3$, and F can be varied widely. A ratio of 1:3:6 ($P:SO_3:F$) gives a maximum amount of phosphorus pentafluoride as indicated by the equation $$2H_3PO_4 + 6SO_3 + 6CaF_2 \rightarrow PF_5 + HPF_6 \cdot 2H_2O + HF + 6CaSO_4$$

The volatile reaction product is cooled to 0°–25° C., condensing the fluorophosphoric acids. The remaining gas—phosphorus pentafluoride and a small amount of phosphoryl fluoride—is passed on to suitable storage facilities.

Due to the nature of hexafluorophosphoric acid, the product liquid phase consists of an equilibrium mixture involving hydrogen fluoride and fluorophosphoric acids as follows:

$$H_2[PO_3F] \underset{H_2O}{\overset{HF}{\rightleftharpoons}} H[PO_2F_2] \underset{2H_2O}{\overset{4HF}{\rightleftharpoons}} H[PF_6]$$

Reducing the reactant ratio to 1:2:4 ($P:SO_3:F$) produces predominantly fluorophosphoric acids.

$$H_3PO_4 + 2SO_3 + 2CaF_2 \rightarrow HPO_2F_2 + 2HF + 2CaSO_4$$

The resulting volatile product rearranges on cooling to an approximately equimolar mixture of difluorophosphoric and hexafluorophosphoric acids.

$$2HPO_2F_2 + 4HF \rightarrow HPO_2F_2 + HPF_6 \cdot 2H_2O$$

A similar product distribution can be obtained by the use of less concentrated phosphoric acid; i.e., 65 percent $P_2O_3$ acid at the 1:3:6 ($P:SO_3:F$) ratio.

While we have set out the reactant ratios of the P, $SO_3$ and F as indicated above, such ratios may be varied widely, the preferred ratios being 1:2:4–1:3:6.

Specific examples which are illustrative of the invention may be set out as follows:

EXAMPLE I

Liquid sulfur trioxide (0.300 mole, 24.0 g.) was added dropwise to 0.100 mole (9.8 g.) 72.4 percent $P_2O_5$ phosphoric acid with adequate stirring and cooling to maintain the temperature at 50° C. Pulverized fluorspar (0.300 mole, 24.4 g., 96.0 percent $CaF_2$) was blended into the acid and the mixture was heated in a closed system to 200° C. until constant pressure was reached. A total heating time of 2 hrs. was required. The volatile material was expanded into an evacuated cold (−196° C.) cylinder. Fractionation at −78° C. produced 4.4 g. phosphorus pentafluoride and 10.2 g. hexafluorophosphoric acid.

EXAMPLE II

A mixture of sulfur trioxide (0.300 mole, 24.0 g.), 72.4 percent $P_2O_5$ phosphoric acid (0.100 mole, 9.8 g.) and sodium fluoride (0.600 mole, 25.2 g.) was reacted as described in example I. After heating for 3 hrs., 3.9 g. phosphorus pentafluoride and 10.3 g. hexafluorophosphoric acid was obtained.

EXAMPLE III

Dilute sulfur trioxide gas (10 vol. percent) was passed into 72.4 percent $P_2O_5$ phosphoric acid (0.100 mole, 9.8 g.) at 100° C. until 2 moles $SO_3$ per mole $H_3PO_4$ had been absorbed. After cooling to 0° C., pulverized fluorspar (0.200 mole $CaF_2$) was added and the mixture treated as described in example I. The collected liquid (10.8 g.) consisted of approximately equimolar quantities of difluorophosphoric and hexafluorophosphoric acid.

While in the foregoing specification we have set out specific procedure in considerable detail for the purpose of illustrating embodiments of the invention, it will be understood that such details may be varied widely by those skilled in the art without departing from the spirit of our invention.

It is claimed:

1. In a process for preparing phosphorus pentafluoride, the steps of heating phosphoric acid or monofluorophosphoric acid, with sulfur trioxide, and an alkali or alkaline earth fluoride, in the range of about 120°–350° C. to evolve phosphorus-fluorine gases, and recovering the gases.

2. The process of claim 1 in which the phosphate source and sulfur trioxide are premixed before admixture with the alkali or alkaline earth fluoride.

3. The process of claim 2 in which the sulfur trioxide is premixed with the phosphate source in the reactant molar ratio of about 3:1.

4. The process of claim 1 in which the fluoride salt is fluorspar.

5. In a process for preparing volatile phosphorus-fluorine compound products, the steps of mixing concentrated phosphoric acid having a $P_2O_5$ content of about 65–82 weight percent $P_2O_5$ with sulfur trioxide and a fluoride salt selected from the group consisting of alkali and alkaline earth fluorides and heating the mixture in the range of 120°–350° C. to evolve phosphorus-fluorine gases, and recovering the gases.

6. The process of claim 5 in which the sulfur trioxide is mixed with the phosphoric acid in the reactant molar ratio of about 3:1.

7. The process of claim 6 in which the phosphoric acid and sulfur trioxide are premixed before admixture with the fluoride salt.

8. The process of claim 5 in which the reactant molar ratio of $P:SO_3:F$ is 1:2:4–1:3:6.

9. In a process for preparing phosphorus pentafluoride, the steps of premixing phosphoric acid and sulfur trioxide and adding the acid mixture to a fluoride salt selected from the group consisting of alkali and alkaline earth fluorides to provide a reactant molar ratio of $P:SO_3:F$ of about 1:3:6, heating the mixture to about 120°–350° C. to evolve phosphorus pentafluoride gases, and recovering said gases.

10. The process of claim 9 in which the fluoride salt is fluorspar.

11. The process of claim 9 in which the mixture is heated to about 200° C.

* * * * *

UNITED STATES PATENT OFFICE
CERTIFICATE OF CORRECTION

Patent No. 3,634,034          Dated January 11, 1972

Inventor(s) John D. Nickerson, et al

It is certified that error appears in the above-identified patent and that said Letters Patent are hereby corrected as shown below:

Column 1, line 35, delete the formula and insert the following:

-- $6CaF_2 + 2H_3PO_4 + 6SO_3 \longrightarrow PF_5 + HPF_6 \cdot 2H_2O + HF + 6CaSO_4$ -

Column 1, line 69, delete the formula and insert the following:

-- $H_3PO_4 + 3SO_3 \longrightarrow H_2S_2O_7 + HPO_3 \cdot SO_3$ -- .

Signed and sealed this 14th day of November 1972.

(SEAL)
Attest:

EDWARD M. FLETCHER, JR.          ROBERT GOTTSCHALK
Attesting Officer          Commissioner of Patents